(12) United States Patent
Okayama et al.

(10) Patent No.: US 6,654,260 B2
(45) Date of Patent: Nov. 25, 2003

(54) ASYMMETRICAL POWER CONVERTING APPARATUS EMPLOYING SELF-ARC-SUPPRESSING SWITCHES

(75) Inventors: Hideo Okayama, Tokyo (JP); Toshiyuki Fujii, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/988,248

(22) Filed: Nov. 19, 2001

(65) Prior Publication Data

US 2002/0167825 A1 Nov. 14, 2002

(30) Foreign Application Priority Data

May 9, 2001 (JP) ........................................ 2001-139070

(51) Int. Cl.[7] ............................................... H02M 5/44
(52) U.S. Cl. ..................... 363/37; 363/132; 363/137; 363/141
(58) Field of Search ........................ 363/37, 132, 136, 363/137, 141

(56) References Cited

U.S. PATENT DOCUMENTS

| | | | | |
|---|---|---|---|---|
| 4,965,710 A | * | 10/1990 | Pelly et al. | 363/132 |
| 5,497,289 A | * | 3/1996 | Sugishima et al. | 363/37 |
| 5,953,224 A | * | 9/1999 | Gold et al. | 363/141 |
| 6,101,114 A | * | 8/2000 | Kijima et al. | 363/132 |
| 6,188,589 B1 | * | 2/2001 | Okayama et al. | 363/136 |

FOREIGN PATENT DOCUMENTS

JP 61-288780 12/1986

OTHER PUBLICATIONS

H. Matsuda et al.; "High Power (4.5kV, 4kA turn–off) IEGT", EPE Dec. '99, Lausanne, pp. 1–4.

S. Iesaka et al.; "High–Power Device IEGTs for Power Electronics" Toshiba Review, vol. 55, No. 7, pp. 7–10 (Dec. 2000).

P. K. Stelmer et al.; "IGCT—a new, emerging technology for high–power, low–cost inverters", ABB Review pp. 34–42, May 1998.

* cited by examiner

Primary Examiner—Jeffrey Sterrett
(74) Attorney, Agent, or Firm—Leydig, Voit & Mayer, Ltd.

(57) ABSTRACT

The present invention provides a power converter system in which forward conversion capacities and reverse conversion capacities of semiconductor power converter apparatuses connected to a D.C. capacitor can be different from one another. The more suitable semiconductor power converter apparatuses can be selected in accordance with various loads. A power converter system includes semiconductor power converter apparatuses including a D.C. capacitor and power devices cooled by a cooling elements having an output terminal connected to a load. The semiconductor power converter apparatuses are connected in parallel with one another through the D.C. capacitor. Each of the power devices includes self-arc-suppressing semiconductor devices and diodes connected in anti-parallel with the self-arc-suppressing semiconductor devices. All of the semiconductor power converter apparatuses have the same circuit configuration. The power device of a first of the semiconductor power converter apparatuses has characteristics different from those of the power devices of the other semiconductor power converter apparatuses.

18 Claims, 11 Drawing Sheets

SWITCHING LOSS CHARACTERISTICS OF REVERSE CONDUCTION TYPE POWER DEVICE 6

ON-VOLTAGE CHARACTERISTICS OF REVERSE CONDUCTION TYPE POWER DEVICE 6

ASYMMETRICAL POWER CONVERTING APPARATUS EMPLOYING SELF-ARC-SUPPRESSING SWITCHES

BACKGROUND OF THE INVENTION

1. Field of the Invention

The present invention relates to a power converter system which is constituted by semiconductor power converter apparatuses each employing self-arc-suppressing semiconductor devices.

2. Description of the Related Art

As for the recent typical self-arc-suppressing semiconductor devices, there are Insulated Gate Bipolar Transistors (the so-called IGBTs) and Injection Enhanced Gate Transistors (the so-called IEGTs), both of which are classified as gate voltage driving semiconductor devices, and Gate Commutated Turn-off Thyristors (the so-called GCTs) which are classified as a gate current driving semiconductor device. In the case where such self-arc-suppressing semiconductor devices are accommodated together with diodes which are connected in anti-parallel therewith, in the same package, with a reverse conduction function, they are sometimes called reverse conduction power devices.

For example, with respect to the IEGTs, as described in EPE '99-Lausanne "HIGH POWER (4.5 kV, 4 kA turn off) IEGT", a plurality of IEGT chips and a plurality of diode chips can be accommodated in the same package to be used as one reverse conduction type power device. With respect to the IEGT having the collector current of 1.5 kA described in that article, the total number of chips which are accommodated in one package is 42, and these chips are broken down into the 30 IEGT chips and 12 diode chips.

In addition, in an article of TOSHIBA REVIEW Vol. 55, No. 7,2000 "High-Power Device IEGTs For Power Electronics", there is described an IEGT which has a collector current of 750 A and which is different in outside dimension of the package from the above-mentioned IEGT. The total number of chips which are accommodated in one package is 21, and these chips are broken down into the 15 IEGT chips and the 6 diode chips. With respect to these chips, the total number of chips which are accommodated in the package is changed to make the collector currents different from one another. With respect to the semiconductor power converter apparatus employing the IEGT, a three-level inverter having a rated capacity of 8 MVA is described in an article of TOSHIBA REVIEW Vol. 55, No. 7,2000 "High-Voltage Inverters Employing IEGTs for Industrial Motor Drives".

On the other hand, with respect to the GCT, as described in an article of ABB REVIEW 5/1998 "GIST-a new, emerging technology for high-power, low-cost inverters", the reverse conduction type power device in which the GCT region and the diode region are formed on the same silicon wafer and accommodated in one package has been realized as a product. In this article, the three GCTs are different in outside package dimension from one another. In this case, the area of the silicon wafer which is accommodated in the package is changed to change the controllable ON-current.

In addition, a power converter system, as shown in FIG. 15, a semiconductor power converter apparatus in which electric power is to be rectified, i.e., in a rectifier mode is larger than when the electric power is to be inverted, i.e., in an inverter mode, and a semiconductor power converter apparatus in which electric power is to be rectified is smaller than when the electric power is to be inverted, are connected in parallel with each other through a D.C. capacitor, is disclosed in JAPANESE PATENT APPLICATION LAID OPEN No. 288780 of 1986.

In this connection, the term forward-conversion means power conversion from A.C. to D.C., while the term reverse-conversion means power conversion from D.C. to A.C.

In FIG. 15, reference numeral 24 indicates a single-phase converter, reference numeral 25 indicates a three-phase inverter, reference numeral 26 indicates a D.C. capacitor, reference numeral 27 indicates a single-phase A.C. power source, and reference numeral 28 indicates an induction motor.

The two single-phase converters 24, which are connected in parallel with each other, are applied to a semiconductor power converter apparatus in which electric power to be rectified is larger than the electric power to be inverted, while the three-phase inverter 25 is applied to a semiconductor power converter apparatus in which the electric power to be rectified is smaller than the electric power is to be inverted. In addition, the two single-phase converters 24 and the three-phase inverter 25 are connected in parallel with each other through the D.C. capacitor 26, and the single-phase A.C. power source 27 is connected to an output terminal of the single-phase converter 24.

Also, an induction motor 28 for driving an electric railway system, for example, is connected to an output terminal of the three-phase inverter 25. When subjecting the induction motor 28 to the running power, the two single-phase converters 24 are operated in the forward conversion manner, while the three-phase inverter 25 is operated in the reverse conversion manner. In this case, the two single-phase inverters 24 need to input the driving electric power of the induction motor 28 and the electric power losses of all of the semiconductor power converter apparatuses 24 and 25 through the single-phase A.C. power source 27.

In addition, when subjecting the induction motor 28 to regenerative operation, the three-phase inverter 25 is operated in the forward conversion manner, while the two single-phase converters 24 are operated in the reverse conversion manner. The forward conversion electric power of the three-phase inverters 25 in the regenerative operation is necessarily reduced as compared with the forward conversion electric power of the single-phase converter 24 in the power operation. This results because there is electric power loss in the semiconductor power converter apparatuses 24 and 25, and electric power loss in the induction motor 28, and also the operating electric power is smaller than the regenerative operating power in the induction motor 28.

In the case where the conventional reverse conduction type power devices are accommodated in the package having the same fixed size, only the power devices, each of which has only the collector current or the controllable ON-current, are present. For example, in the IEGTs, the number of IEGT chips and the number of diode chips to the total number of chips is determined, and also in the GCTs, the occupancy ratio of the GCT region and the diode region to the total area of the silicon wafers is also determined.

Therefore, as long as the semiconductor power converter apparatus is constituted by using the reverse conduction type power devices having packages with the same electrode area, it may have the one and only forward convertable electric power and reverse convertable electric power. In other words, in order that the semiconductor power converter apparatus for forward conversion electric power and reverse convertable electric power, which are different from each other, may be constituted by using the conventional reverse conduction type power devices, the reverse conduction type power devices which are accommodated in the packages having different electrode areas and which are different in the collector current or the controllable ON-current from each other need to be applied to the semiconductor power converter apparatus.

In addition, since the reverse conduction power devices having different electrode areas must be cooled using different heat sinks or cooling fins, there arises the problem that it is impossible that the structures which are physically identical to one another are applied thereto to construct the semiconductor power converter apparatus, and hence the cost of the power converter system is increased.

In addition, in the case where the motor is driven by the semiconductor power converter apparatus employing the conventional reverse conduction type power devices, there arises the problem that the maximum capacity of the drivable motor is reduced.

This problem will now be described in detail while quoting the power converter system employed as adjustable speed driver for a motor having a configuration in which two three-phase semiconductor power converter apparatuses employing the reverse conduction type power devices having packages having the same electrode area are connected in parallel with each other through a D.C. capacitor, and one three-phase semiconductor power converter apparatus is connected to an A.C. power source, while the other three-phase semiconductor power converter apparatus is connected to the motor.

When the motor carries out the power running, the semiconductor power converter apparatus to which the A.C. power source is connected needs to, from the A.C. power source, forward-convert the total electric power of the electric power which is reverse-converted by the semiconductor power converter apparatus connected to the motor and the electric power loss of the two semiconductor power converter apparatuses to supply the resultant electric power. In this power running, regarding the conduction ratios of the self-arc-suppressing semiconductor devices and the diodes in the reverse conduction type power devices constituting the semiconductor power converter apparatus to which the motor is connected, it is understood that the self-arc-suppressing semiconductor device shows the larger conduction ratio. Also, regarding the conduction ratios of the self-arc-suppressing semiconductor devices and the diodes in the reverse conduction type power devices constituting the semiconductor power converter apparatus to which the A.C. power source is connected, it is understood that the diode shows the larger conduction ratio.

This can be inferred from that the semiconductor power converter apparatus having the A.C. power source connected thereto is placed in the running state near the forward conversion, i.e., the diode rectifier. The capacity of the motor which can be driven by the power converter system is limited by the forward-convertable electric power of the apparatus capacity of the semiconductor power converter apparatus connected to the A.C. power source.

Therefore, in the case where there is employed the reverse conduction type power device in which the occupation ratio of the conventional self-arc-suppressing semiconductor devices and the diodes is decided with respect to one package, there arises the problem that the capacity of the motor which can be driven in the adjustable speed manner is reduced.

As for the conventional method of solving that problem, there is the application of the circuit configuration in which the semiconductor power converter apparatus connected to the motor is made the three-phase configuration, and also the semiconductor power converter apparatus connected to the A.C. power source is made the single-phase configuration and are connected in the parallel multiplex manner. By the application of this circuit configuration, the forward-convertable electric power of the semiconductor power converter apparatus connected to the A.C. power source can be made larger than the reverse-convertable electric power of the semiconductor power converter apparatus connected to the motor because the minimum necessary number of reverse conduction type power devices is six with respect to the semiconductor power converter apparatus connected to the motor, while it is eight with respect to the semiconductor power converter apparatus connected to the A.C. power source.

In the prior art as described above, in addition to the problem that the number of reverse conduction type power devices used in the semiconductor power converter apparatus connected to the A.C. power source is increased as compared with the number of reverse conduction type power devices used in the semiconductor power converter apparatus connected to the motor, there arises the problem that since the semiconductor power converter apparatuses having the different circuit configurations must be employed, the same components and parts can not be applied to the semiconductor power converter apparatuses, and hence the cost required to manufacture the power converter system is increased.

SUMMARY OF THE INVENTION

In view of the foregoing, the present invention has been made in order to solve the above-mentioned problems associated with the prior art, and it is therefore an object of the present invention to provide a power converter system which is capable of making the forward conversion capacities and the reverse conversion capacities of a plurality of semiconductor power converter apparatuses connected to a D.C. capacitor different from one another, and of selecting a more suitable semiconductor power converter apparatus in accordance with each of the various loads, and also of reducing a product cost of the power converter system by making the circuit configurations identical to one another.

The present invention provides a power converter system which includes at least a plurality of semiconductor power converter apparatuses constituted by a D.C. capacitor and a plurality of power devices cooled by a cooling piece(s) having an output terminal connected to a load, and in which the plurality of semiconductor power converter apparatuses are connected in parallel with one another through the D.C. capacitor, the system being characterized in that each of the power devices includes as constituent elements self-arc-suppressing semiconductor devices and diodes each of which is connected in anti-parallel with the associated one of the self-arc-suppressing semiconductor devices; all of the semiconductor power converter apparatuses have the same circuit configuration; and the associated one of the power devices constituting at least one semiconductor power converter apparatus of the semiconductor power converter apparatuses connected to one another through the D.C. capacitor has the characteristics different from those of the other power devices constituting the other semiconductor power converter apparatuses.

In addition, the associated one of the power devices constituting at least one semiconductor power converter apparatus of the semiconductor power converter apparatuses connected to one another through the D.C. capacitor is accommodated in a package at least an electrode area of which is equal to that of each of the other power devices constituting the other semiconductor power converter apparatuses, and has the characteristics in which the quantity of generated heat is different therefrom when allowing the same current to flow therethrough.

In addition, the occupation ratio of the self-arc-suppressing semiconductor devices when the occupation area of the self-arc-suppressing semiconductor devices, and the diodes each of which is connected in anti-parallel with the associated one of the self-arc-suppressing semiconductor devices as the constituent elements of the associated one of the semiconductor power converter apparatuses connected to one another through the D.C. capacitor is decided as the overall occupation area is made different from that of each of the self-arc-suppressing semiconductor devices in the other semiconductors power converter apparatuses.

In addition, the occupation ratio of the self-arc-suppressing semiconductor devices of the associated one of the power devices which is applied to the semiconductor power converter apparatus having the forward-converted electric power larger than the reverse-converted electric power of the semiconductor power converter apparatuses is made smaller than that of the self-arc-suppressing semiconductor devices of the associated one of the power devices which is applied to the semiconductor power converter apparatus having the reverse connected electric power larger than the forward-converted electric power.

In addition, the semiconductor power converter apparatus, constituted by the power device having the smaller occupation ratio of the self-arc-suppressing semiconductor devices, of the semiconductor power converter apparatuses is connected to an A.C. power source, while the semiconductor power converter apparatus, constituted by the power device having the larger occupation ratio of the self-arc-suppressing semiconductor devices, of the semiconductor power converter apparatuses is connected to a motor.

In addition, the respective power devices have the same total number of chips in which a plurality of self-arc-suppressing semiconductor device chips and a plurality of diode chips are included as the constituent elements, and the occupation ratio of the number of self-arc-suppressing semiconductor device chips to the total number of chips of the self-arc-suppressing semiconductor device chips and the diode chips of the associated one of the power devices constituting at least one semiconductor power converter apparatus of the semiconductor power converter apparatus connected to one another through the D.C. capacitor is made different from that of the number of self-arc-suppressing semiconductor device chips in the other semiconductor power converter apparatuses.

In addition, the power devices have, on semiconductor wafers having the same area, regions of the self-arc-suppressing semiconductor devices, regions of the diodes, separation zones for separating the regions of the self-arc-suppressing semiconductors and the regions of the diodes from each other, and gate regions, respectively, and the occupation ratio of the region of the self-arc-suppressing semiconductor devices to the overall occupation area of the region of the self-arc-suppressing semiconductor devices of the associated one of the power devices constituting at least one semiconductor power converter apparatus of the semiconductor power converter apparatuses connected to one another through the D.C. capacitor and the region of the diodes is made different from the occupation ratio of the region of the self-arc-suppressing semiconductor devices in each of the other semiconductor power converter apparatuses.

Moreover, the self-arc-suppressing semiconductor device chip of the power device is either an Insulated Gate Bipolar Transistor or an Injection Enhanced Gate Transistor.

Moreover, the region of the self-arc-suppressing semiconductor devices of each of the power devices has a gate commutation type turn-off thyristor.

Moreover, the diode chip of each of the power devices is a silicon carbide diode chip.

Also, the power devices constituting at least a plurality of semiconductor power converter apparatuses are cooled by heat sinks or cooling fins having at least the same outer shape.

BRIEF DESCRIPTION OF THE DRAWINGS

The above and other objects as well as advantages of the present invention will become clear by the following description of the preferred embodiments of the present invention with reference to the accompanying drawings.

DETAILED DESCRIPTION OF THE PREFERRED EMBODIMENTS

The preferred embodiments of the present invention will hereinafter be described in detail with reference to the accompanying drawings.

(First Embodiment)

Figure 1:
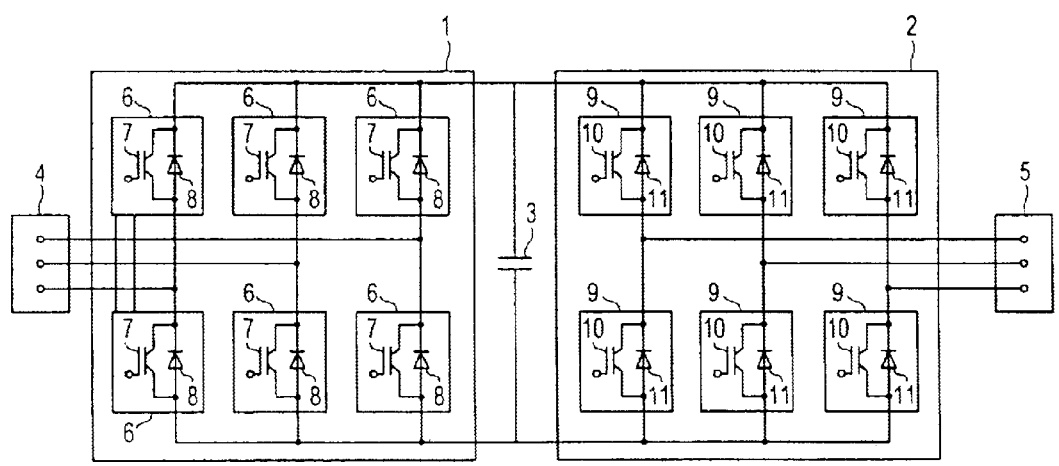
FIG. 1 is the circuit diagram showing a configuration of a power converter system according to a first embodiment of the present invention.

FIG. 1 is a circuit diagram showing the configuration of a power converter system according to a first embodiment of the present invention. In FIG. 1, reference numeral 1 indicates a semiconductor power converter apparatus which is connected to an A.C. power source (not shown), reference numeral 2 indicates a semiconductor power converter apparatus which is connected to a motor (not shown), reference numeral 3 indicates a D.C. capacitor through which the semiconductor power converter apparatus 1 and the semiconductor power converter apparatus 2 are connected in parallel with each other, reference numeral 4 indicates a terminal which is connected to the A.C. power source, and reference numeral 5 indicates a terminal which is connected to the motor.

In the semiconductor power converter apparatus 1, reference numeral 6 indicates a reverse conduction type power device, reference numeral 7 indicates an IEGT as one example of a self-arc-suppressing semiconductor device, and reference numeral 8 indicates a diode. The diode 8 is connected in anti-parallel with the IEGT 7. In the semiconductor power converter apparatus 2, reference numeral 9 indicates a reverse conduction type power device, reference numeral 10 indicates an IEGT as one example of a self-arc-suppressing semiconductor device, and reference numeral 11 indicates a diode. The diode 11 is connected in anti-parallel with the IEGT 10.

Figure 2:
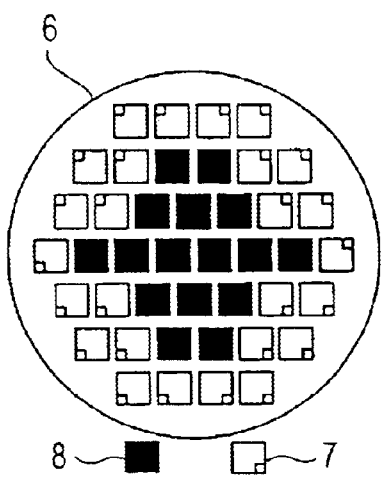
FIG. 2 is the view showing a reverse conduction type power device according to a first embodiment of the present invention.
Figure 3:
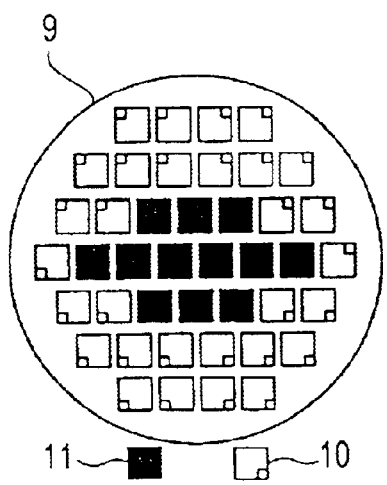
FIG. 3 is a view showing a reverse conduction type power device according to the first embodiment of the present invention.

FIG. 2 is a view showing the chip arrangement in the interior of the package of the reverse conduction type power device 6, and FIG. 3 is a view showing the chip arrangement inside the package of the reverse conduction type power device 9. With respect to the reverse conduction type power device 6, it is assumed that the number of IEGT chips 7 is 26, the number of diode chips 8 is 16, and hence the total number of chips is 42. In addition, with respect to the reverse conduction type power device 9, it is assumed that the number of IEGT chips 10 is 30, the number of diode chips 11 is 12, and hence the total number of chips is 42 similarly to the reverse conduction type power device 6. In this way, the total number of chips in the reverse conduction type power device 6 is made equal to that in the reverse conduction type power device 9, whereby the reverse conduction type power device 6 and the reverse conduction type power device 9 can be accommodated in the packages having the same electrode area, respectively.

Figure 4:
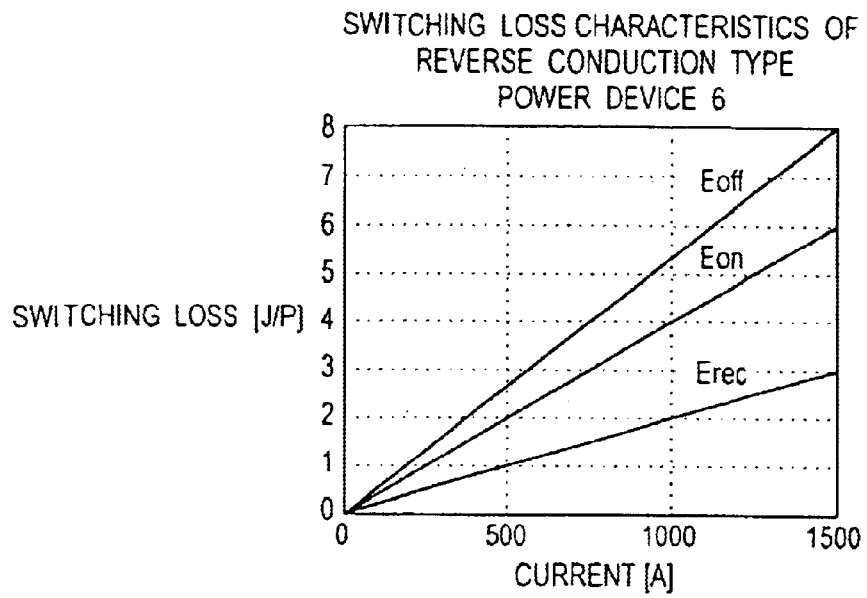
FIG. 4 is a graph explaining the characteristics of a reverse conduction type power device according to the first embodiment of the present invention.
Figure 5:
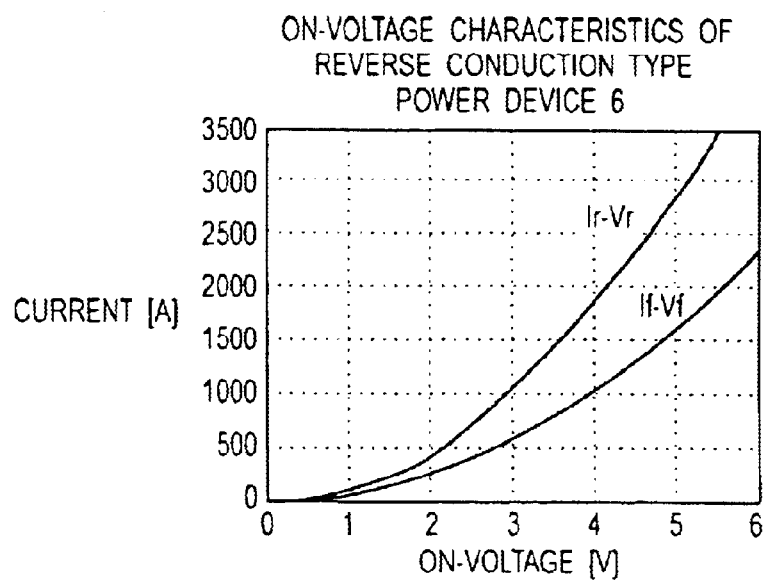
FIG. 5 is a graph explaining the characteristics of a reverse conduction type power device according to the first embodiment of the present invention.
Figure 6:
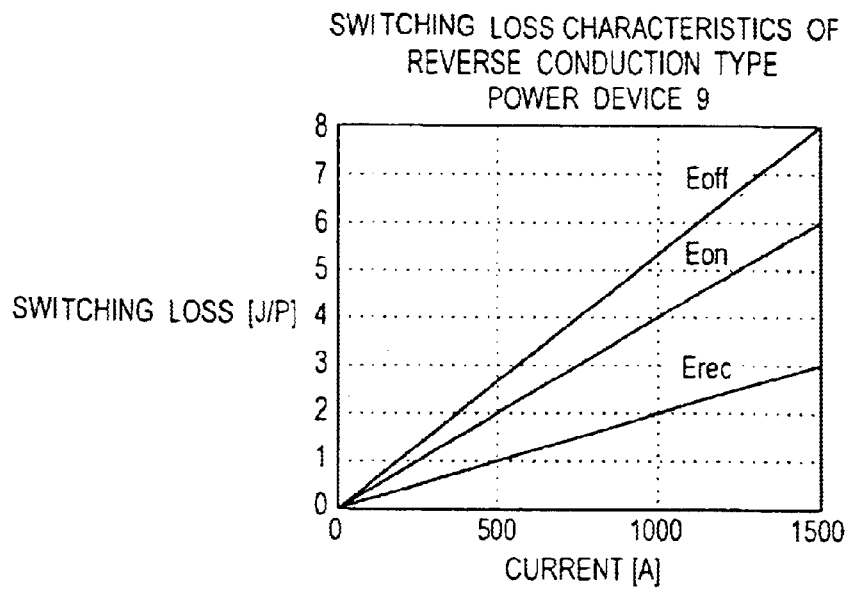
FIG. 6 is a graph explaining the characteristics of a reverse conduction type power device according to the first embodiment of the present invention.
Figure 7:
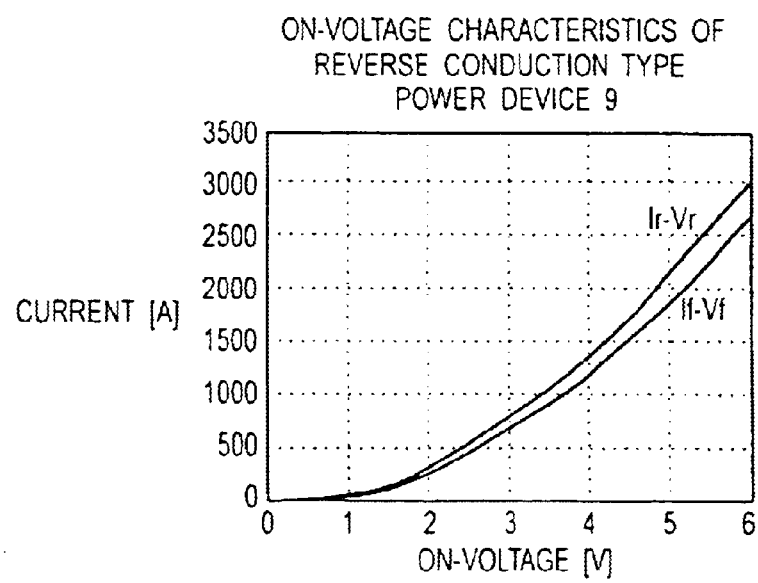
FIG. 7 is a graph explaining the characteristics of a reverse conduction type power device according to the first embodiment of the present invention.

FIG. 4 shows the characteristics of the switching loss against the conduction current of the reverse conduction type power device 6, and FIG. 5 shows the characteristics of the ON-voltage against the conduction current of the reverse conduction type power device 6. Also, FIG. 6 shows the characteristics of the switching loss against the conduction current of the reverse conduction type power device 9 which are derived from the characteristics of the individual chips employed in the reverse conduction type power device 6, and FIG. 7 shows the characteristics of the ON-voltage against the conduction current of the reverse conduction type power device 9 which are derived from the characteristics of the individual chips employed in the reverse conduction type power device 6. In these figures, reference symbol Eoff indicates the turn-off loss of the IEGT, reference symbol Eon indicates the turn-on loss of the IEGT, and reference symbol Erec indicates the reverse recovery loss of the diode. In addition, If-Vf is the ON-voltage characteristics of the IEGT, and Ir-Vr is the ON-current characteristics of the diode.

For example, when the forward current is 1,500 A, the reverse conduction type power device 6 shows the ON-voltage of 4.9 V (refer to If-Vf characteristics in FIG. 5), and the reverse conduction type power device 9 shows the ON-voltage of 4.5 V (refer to If-Vf characteristics in FIG. 7). On the other hand, when the reverse current is 1,500 A, the reverse conduction type power diode 6 shows the ON-voltage of 3.6 V (refer to Ir-Vr in FIG. 5), and the reverse conduction type power device 9 shows the ON-voltage of 4.2 V (refer to Ir-Vr in FIG. 7).

In particular, the reverse conduction type power device 6 and the reverse conduction type power device 9 are made to have the different ON-voltages which are remarkably shown in FIG. 5 and FIG. 7, respectively, whereby when the same current is caused to flow through the reverse conduction type power device 6 and the reverse conduction type power device 9, the quantities of generated heat can be made different from each other.

Figure 8:
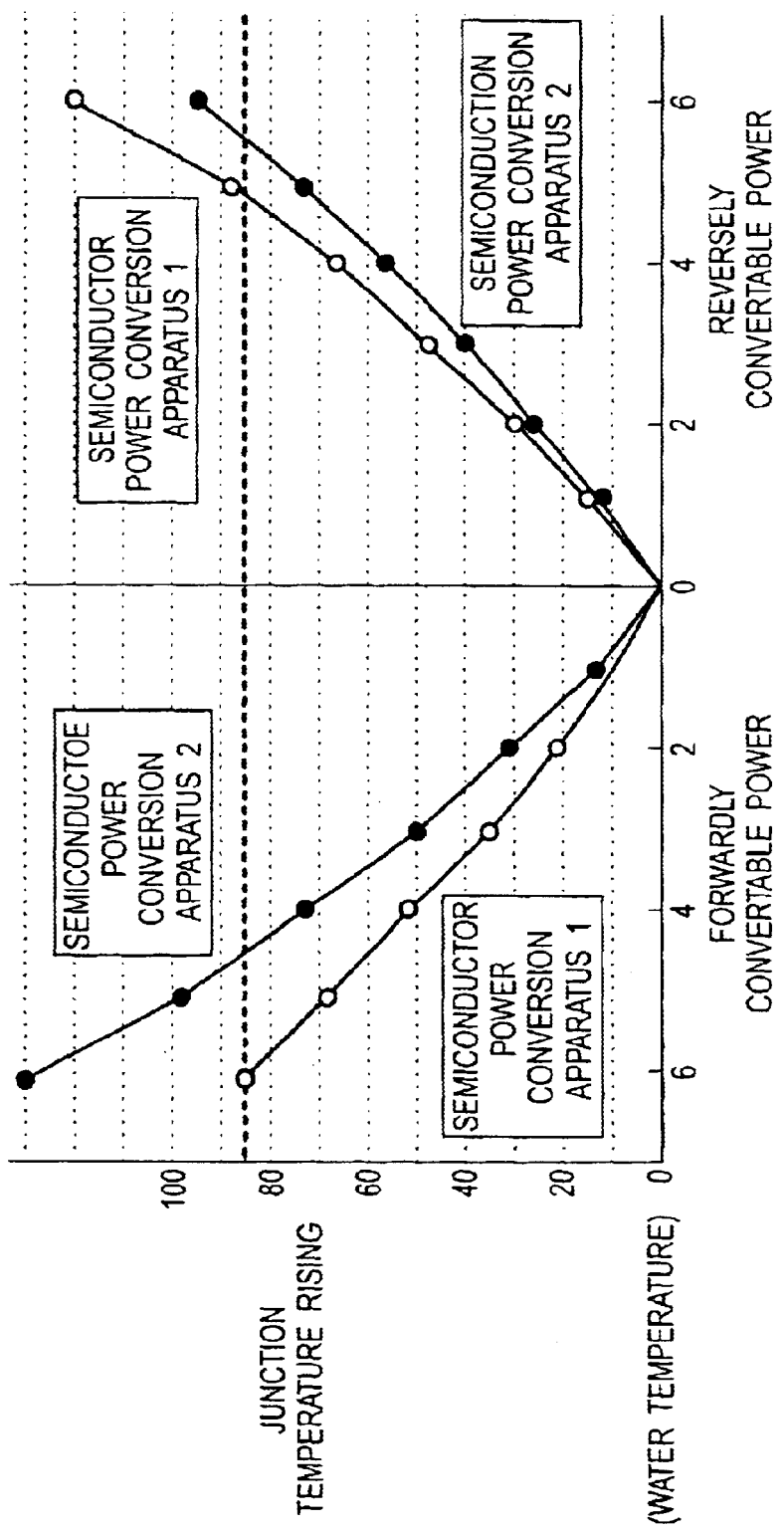
FIG. 8 is a graph explaining the forward and reverse convertable electric power capacity of a semiconductor power converter apparatus according to the first embodiment of the present invention.

In FIG. 8, a case is assumed where the reverse conduction type power devices 6 and 10 are water-cooled using the cooling piece(s) such as the heat sink, and the results of calculating the forward convertable electric power and the reverse convertable electric power of the semiconductor power converter apparatuses 1 and 2 against the rising temperatures of the junction temperature of the reverse conduction type power devices 6 and 10 from the temperature of the cooling water are shown in the form of the graph. With respect to the calculation conditions, there are used the conditions that the D.C. voltage is 2.7 kV, the A.C. voltage is 3.3 kVrms, and the switching frequency is 250 Hz.

In the case where of the junction temperature from the water temperature is allowed to rise up to 85 degrees, the maximum value of the forward convertable electric power of the semiconductor power converter apparatus 1 constituted by the reverse conduction type power devices 6 is about 6 MVA, while the reverse convertable electric power thereof is about 5 MVA. On the other hand, the maximum value of the forward convertable electric power of the semiconductor power converter apparatus 2 constituted by the reverse conduction type power devices 9 is about 4.5 MVA, and the maximum value of the reverse convertable electric power thereof is about 5.5 MVA.

When the motor carries out the power running, the operation of the semiconductor power converter apparatus 1 becomes the forward conversion operation, while the operation of the semiconductor power converter apparatus 2 becomes the reverse conversion operation. What we can understand from FIG. 8 is that in the case of the power running, the maximum value 6 MVA of the forward convertable electric power of the semiconductor power converter apparatus 1 can exceed the maximum value 5.5 MVA of the reverse convertable electric power of the semiconductor power converter apparatus 2. In the case where each of the semiconductor power converter apparatuses 1 and 2 is constituted by using only the reverse conduction power devices 9 for example as in the prior art, the maximum value of the forward convertable electric power becomes 4.5 MVA, and hence can not exceed the maximum value 5.5 MVA of the reverse convertable electric power.

Therefore, the reverse conversion electric power capacity is suppressed on the basis of the maximum value 4.5 MVA of the forward convertable electric power of the semiconductor power converter apparatus 1. Even if the maximum value of the reverse convertable electric power of the semiconductor power converter apparatus 2 is about 5.5 MVA, the characteristics thereof can not be sufficiently utilized. In other words, the capacity of the motor which can be driven in the variable-speed manner is reduced.

In this way, while being accommodated in the same package, the reverse conduction type power device is used in which the occupation ratio of the area of the self-arc-suppressing semiconductor devices 7 to the overall area of the self-arc-suppressing semiconductor devices 7 and the area of the diodes 8 is made different from the occupation ratio of the area of the self-arc-suppressing semiconductor devices 10 to the overall area of the self-arc-suppressing semiconductor elements 10 and the diodes 11, and the reverse conduction type power device 6 having the lower occupation ratio of the self-arc-suppressing semiconductor devices 7 is applied to the semiconductor power converter apparatus 1 which is connected to the A.C. power source and for which the reverse conversion electric power capacity is required, while the reverse conduction type power device 9 having the higher occupation ratio of the self-arc-suppressing semiconductor devices 10 is applied to the semiconductor power converter apparatus 2 which is connected to the motor and for which the reverse conversion electric power capacity is required, whereby the larger motor can be driven.

When driving the motor, if the rotational speed is damped, then the A.C. reverse electromotive force is generated in the motor and hence the regenerative electric power is inputted to the semiconductor power converter apparatus 2. This generative electric power is normally smaller than the electric power required for the power running of the motor. Therefore, FIG. 8, though the maximum value 4.5 MVA of the forward convertable electric power of the semiconductor power converter apparatus 2 is smaller than the maximum value 5 MVA of the reverse convertable electric power of the semiconductor power converter apparatus 1, any of the practical problems does not arise.

(Second Embodiment)

Figure 9:
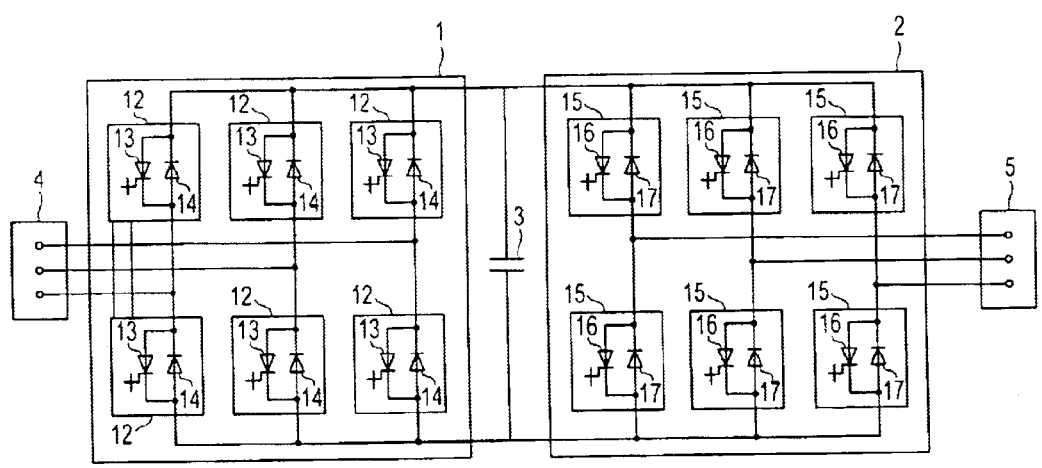
FIG. 9 is a circuit diagram showing a configuration of a power converter system according to the second embodiment of the present invention.

FIG. 9 is a circuit diagram showing the configuration of a power converter system in which the occupation ratio of the region of the above-mentioned self-arc-suppressing semiconductor devices to the overall occupation area of the region of the self-arc-suppressing semiconductor devices and the region of the diodes in the reverse conduction type power device of the semiconductor power converter apparatus 1 in the power converter system according to the first embodiment shown in FIG. 1 is made different from the occupation ratio of the region of the above-mentioned self-arc-suppressing semiconductor devices in the reverse conduction type power device of the other semiconductor power converter apparatus 2.

In FIG. 9, in the semiconductor power converter apparatus 1, reference numeral 12 indicates a reverse conduction type power device, reference numeral 13 indicates a GCT as the self-arc-suppressing semiconductor device, and reference numeral 14 indicates a diode. The diode 14 is connected in anti-parallel with the GCT 13. In the semiconductor power converter apparatus 2, reference numeral 15 indicates a reverse conduction type power device, reference numeral 16 indicates a GCT as the self-arc-suppressing semiconductor device, and reference numeral 17 indicates a diode. The diode 17 is connected in anti-parallel with the GCT 16.

Figure 10:
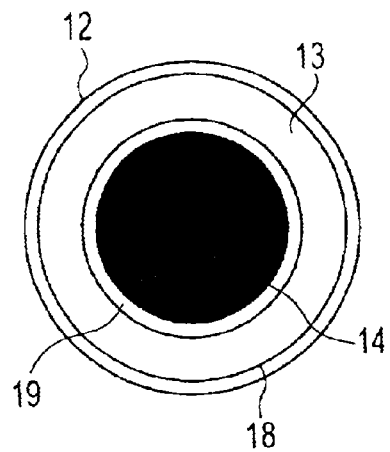
FIG. 10 is a view showing a reverse conduction type power device according to the second embodiment of the present invention.
Figure 11:
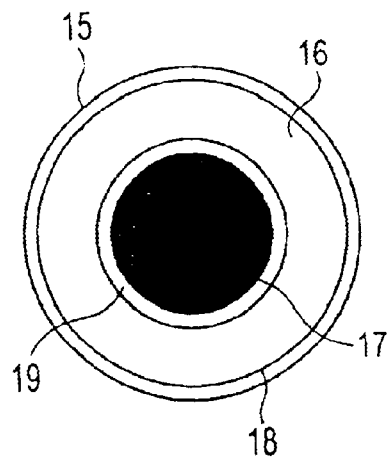
FIG. 11 is a view showing a reverse conduction type power device according to the second embodiment of the present invention.

FIG. 10 is a view showing a wafer inside the package of the reverse conduction type power device 12; and FIG. 11 is a view showing a wafer inside the package of the reverse conduction type power device 15. In these figures, reference numeral 18 indicates a gate region, and reference numeral 19 indicates a separation zone between the GCT region and the diode region.

With respect to the reverse conduction type power device 12, for example, it is assumed that the region of the GCTs 13 is 60%, and the region of the diodes 14 is 40%, while with respect to the reverse conduction type power device 15, the region of the GCTs 16 is 70%, and the region of the diodes 17 is 30%. The overall areas of the wafers are made identical to each other, whereby the reverse conduction type power devices 12 and the reverse conduction type power devices 15 can be accommodated in the packages having the same electrode area, respectively.

As can be inferred from what has been described with respect to the case of the IEGTs, though the reverse conduction type power devices 12 and 15 shown in FIG. 10 and FIG. 11, respectively, are accommodated in the same package, these power devices 12 and 15 can show the different switching loss characteristics and the ON-voltage characteristics. In this way, these power devices 12 and 15 are made to have the characteristics different from each other, whereby when the same current is caused to flow through the reverse conduction type power device 12 and the reverse conduction type power device 15, the quantities of generated heat thereof can be made different from each other.

Thus, while being accommodated in the same package, the reverse conduction type power device is applied in which the occupation ratio of the area of the self-arc-suppressing semiconductor devices 13 to the overall area of the self-arc-suppressing semiconductor devices 13 and the diodes 14 is made different from the occupation ratio of the area of the self-arc-suppressing semiconductor devices 16 to the overall area of the self-arc-suppressing semiconductor elements 16 and the diodes 17, and the reverse conduction type power device 12 having the lower occupation ratio of the self-arc-suppressing semiconductor devices 13 is applied to the semiconductor power converter apparatus 1 which is connected to the A.C. power source and for which the reverse conversion electric power capacity is required, while the reverse conduction type power device 15 having the higher occupation ratio of the self-arc-suppressing semiconductor devices 16 is applied to the semiconductor power converter apparatus 2 which is connected to the motor for example and for which the reverse conversion electric power capacity is required, whereby the larger motor can be driven.

As described above, the IEGT as one example of the gate voltage driving reverse conduction type power device is shown in FIG. 2 and FIG. 3, and the GCT as one example of the gate current driving reverse conduction type power device is shown in FIG. 10 and FIG. 11. In this way, the present invention has been described.

In addition, while for the sake of convenience of the description, the quantitative numeric values have been employed with respect to the concrete numbers of IEGT chips and diode chips as well as the areas of the GCT regions and the diode regions, it is to be understood that the present invention is not intended to be limited to these numeric values.

For example, if the switching loss characteristics or ON-voltage characteristics themselves are different from each other, then the change of the number of chips, the area or the like will be required as a matter of course. In addition, even if the shape of the electrode is not a circle, but is some other shapes such as a square, the semiconductor power converter apparatus is constituted by using the reverse conduction type power devices which are accommodated in the packages having the same electrode area, respectively, and which have the quantities of generated heat different from each other when allowing the same current to flow therethrough, whereby the object of the present invention can be attained. Further, since with respect to the module type IGBT as well, it includes a plurality of IGBT chips and diode chips, it is no problem to apply the present invention thereto, and it is to be understood that the same effects can be obtained.

(Third Embodiment)

As described in the above-mentioned first embodiment, the power devices 6 and 9 which are applied to the semiconductor power converter apparatuses 1 and 2, respectively, are designed in such a way that their allowable junction temperatures become equal to each other, whereby though being accommodated in the packages having the electrode areas which are equal to those of the semiconductor power converter apparatuses 1 and 2, respectively, in the case where the reverse conduction type power devices having the quantities of generated heat different from each other when allowing the same current to flow therethrough are employed, the same cooling piece(s)(heat sink) can be used.

Figure 12:
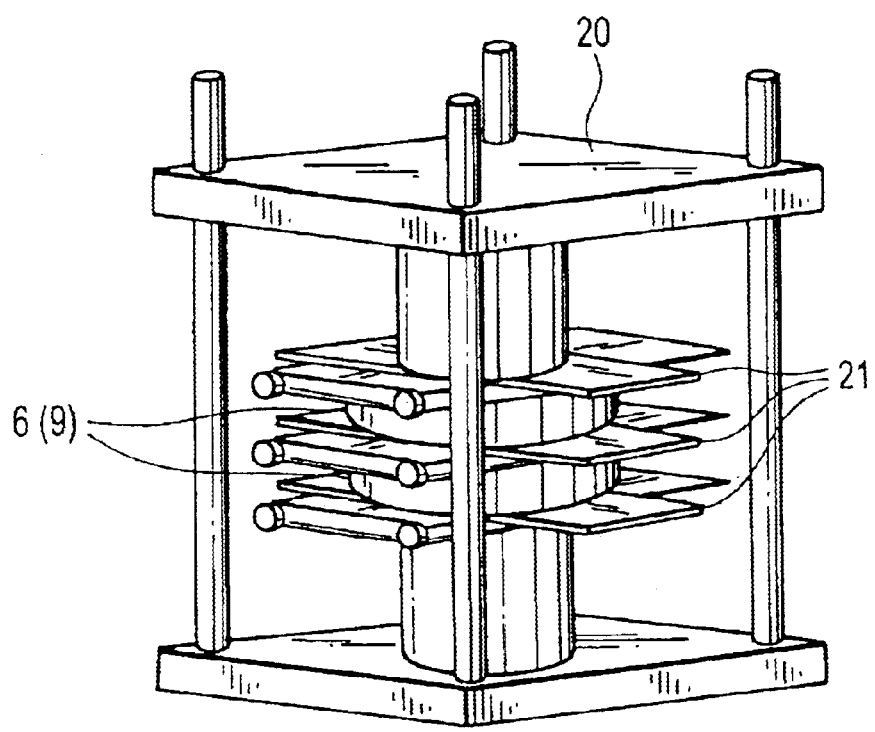
FIG. 12 is an exterior view showing the stack structure which is incorporated into a pressure structure body according to a third embodiment of the present invention.

FIG. 12 is an exterior view showing the concrete construction of a power converter system according to a third embodiment of the present invention. In the figure, reference numeral 20 indicates a pressure structure body, and reference numeral 21 indicates a heat sink.

The reverse conduction type power devices 6 are cooled by the heat sink 21. Since the reverse conduction type power device 6 has the same electrode area as that of the reverse conduction type power device 9, these devices 6 and 9 can be simply replaced with each other. Since the completely same heat sink 21 can be employed, even if the forward conversion capacity is made different from the reverse conversion capacity, for example, the semiconductor power converter apparatuses 1 and 2 in FIG. 1 can be realized by the sharable structure for which the completely same components and parts can be used.

Further, in FIG. 12, the illustration of the peripheral circuits such as the gate driving circuit and the snubber circuit is omitted here for the sake of simplicity.

(Fourth Embodiment)

While in FIG. 1, there is shown the power converter system in which the two semiconductor power converter apparatuses 1 and 2 are connected in parallel with the D.C. capacitor, in order to cope with the request for the larger capacity, it is conceivable to increase the number of parallel connections.

Figure 13:
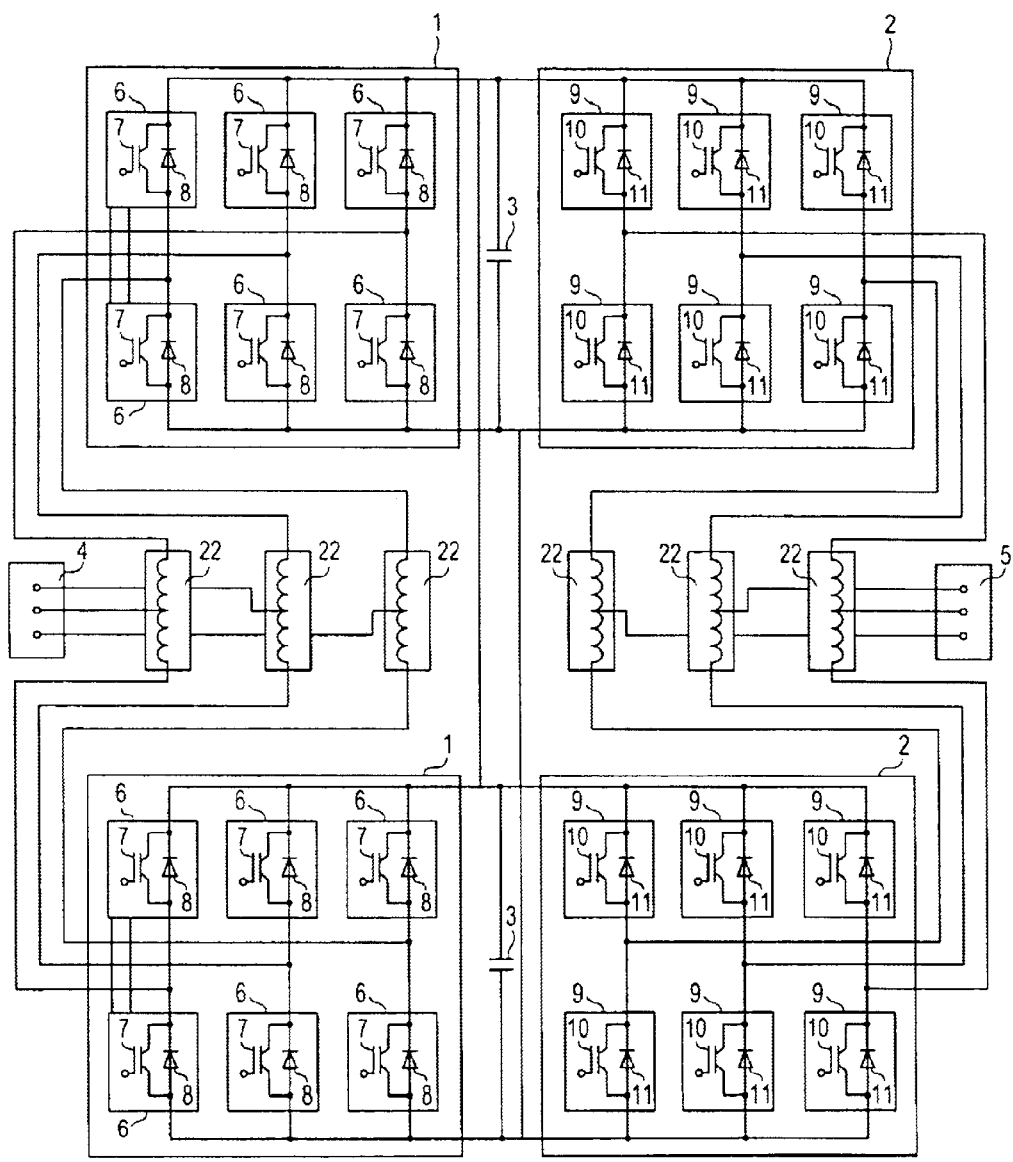
FIG. 13 is a circuit diagram showing a configuration of a power converter system according to a fourth embodiment of the present invention.

In FIG. 13, there is shown a power converter system in which the two semiconductor power converter apparatuses 1 and 2 are connected in parallel with each other through a current limiting reactor 22, and the semiconductor power converter apparatuses 1 and 2 the number of which is four in total are connected in parallel with the D.C. capacitor 3. The number of parallel connections of the semiconductor power converter apparatuses 1 and 2 can be increased or decreased in accordance with the necessary electric power capacity. In such a case as well, the same effects of the present invention described in the first or second embodiment and are obtained.

(Fifth Embodiment)

As shown in FIG. 2 and FIG. 3, in the reverse conduction type power device in the first to fourth embodiments, at present, in general, the silicon diode is employed in each of the diode chips 7 and 10. However, in particular, the silicon carbide diode is employed in the diode chips 7 and 10, whereby the promotion of the low loss can be realized. The low loss characteristics of the silicon carbide diode are utilized, whereby the number of diode chips can be reduced. In other words, the occupation ratio of the self-arc-suppressing semiconductor device chips 7 and 10 to the overall number of chips can be made greatly different compared with the case where the current silicon diodes are employed.

Therefore, the effect of the present invention that the motor having the larger capacity can be driven can be made more remarkable.

(Sixth Embodiment)

Figure 14:
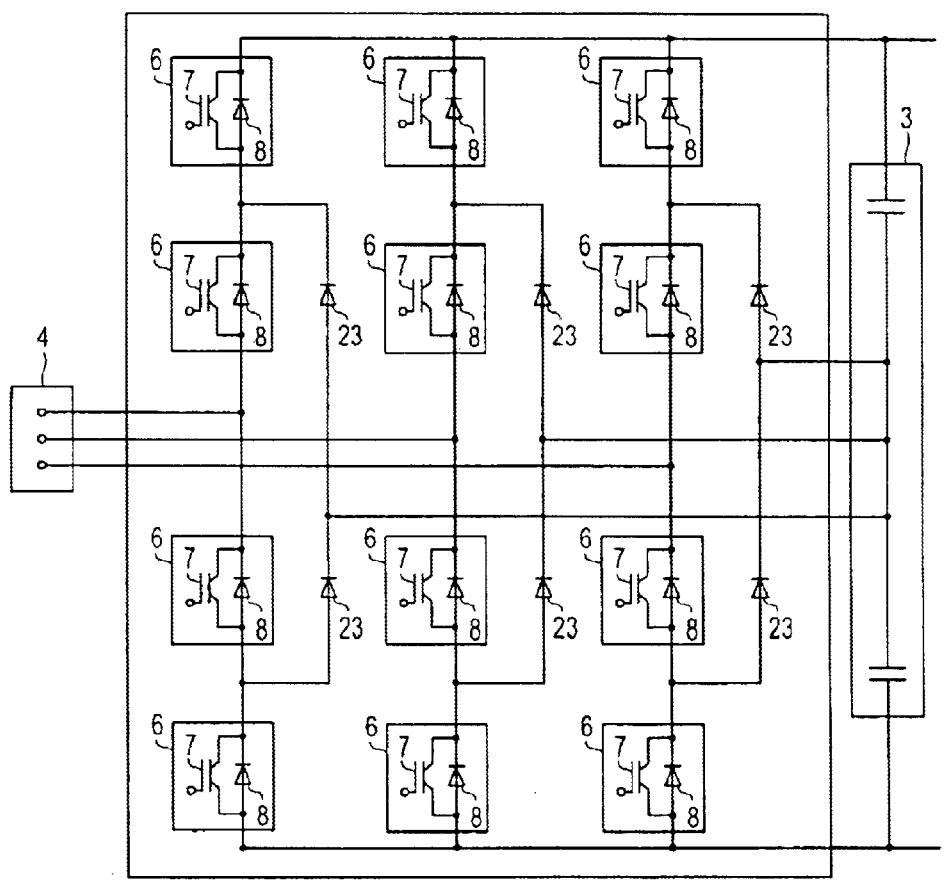
FIG. 14 is a circuit diagram showing a configuration of a power converter system employing a three-level power converter apparatus according to a sixth embodiment of the present invention.
Figure 15:
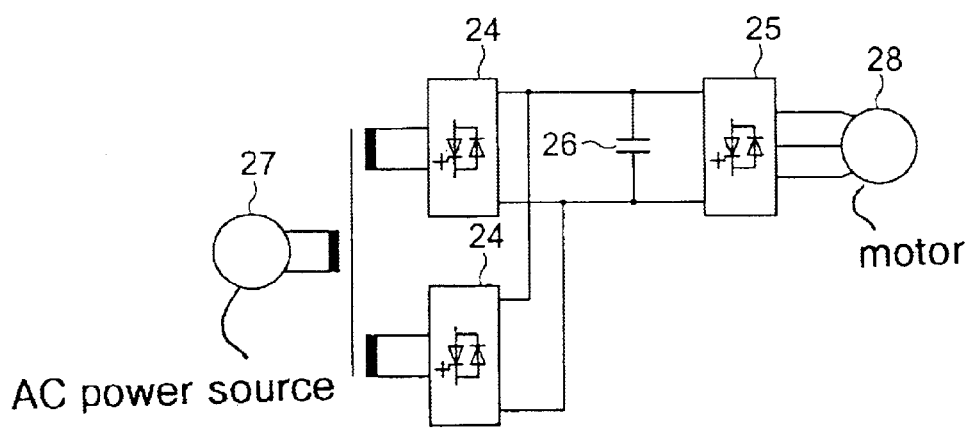
FIG. 15 is a circuit diagram showing a configuration of a conventional power converter system.

In the first embodiment and the third embodiment, the two-level power converter apparatus which can output the voltages of two-level of the D.C. power source to the output terminals 4 and 5 of the respective phases is employed for the semiconductor power converter apparatuses 1 and 2. This results from the intention that the universality of the present invention is shown by employing the circuit configuration which extremely comes into wide use. In other words, the circuit configuration of each of the semiconductor power converter apparatuses 1 and 2 does not need to be limited to the two-level power converter apparatus, but for example is also applied to the three-level power converter apparatus which can output the voltages of three-level of the D.C. power source to the output terminal 4 of each of the phases shown in FIG. 14. In this case, two clamp diodes 23 are additionally required for each of the phases, and the D.C. capacitor 3 are electrically divided to form the electric potentials of three level.

In addition, the circuit configuration of each of the semiconductor power converter apparatuses 1 and 2 can be widely applied to the apparatus to which, though it is the two-level power am converter apparatus, the series connection of the reverse conduction type power devices is applied. That is, the present invention does not limit the circuit configuration of each of the semiconductor power converter apparatuses 1 and 2 at all.

As set forth hereinabove, according to the power converter system of the present invention, each of power devices includes, as the constituent elements, self-arc-suppressing semiconductor devices and diodes which are connected in anti-parallel with the self-arc-suppressing semiconductor devices, all of semiconductor power converter apparatuses have the same circuit configuration, and each of the power devices constituting each of the semiconductor power converter apparatuses is configured in such a way as to have the characteristics different from those of each of the power devices constituting each of other semiconductor power converter apparatuses. Thus, the forward conversion capacities and the reverse conversion capacities of a plurality of semiconductor power converter apparatuses connected to a D.C. capacitor can be made different from one another. Therefore, the more suitable semiconductor power converter apparatuses can be selected in accordance with the various loads, and also the product cost required for the power converter system can be reduced by making the circuit configurations identical to one another.

In addition, since the semiconductor power converter apparatus is constituted by the power devices which, though being accommodated in the packages in which at least the electrode areas thereof are equal to one another, have the quantities of generated heat different from one another when allowing the same current to flow therethrough, the forward conversion capacities and the reverse conversion capacities of a plurality of semiconductor power converter apparatuses connected to the D.C. capacitor can be made different from one another while applying thereto the power devices which are accommodated in the same package. Therefore, the more suitable semiconductor power converter apparatuses can be selected in accordance with the various loads, and by employing the same package for the power devices, the product cost of the power converter system as well as the product cost of the semiconductor power converter apparatus can be reduced.

In addition, the occupation ratio of the self-arc-suppressing semiconductor devices when the occupation area of the self-arc-suppressing semiconductor devices and the diodes each connected in parallel with the associated one of the self-arc-suppressing semiconductor devices which are the constituent elements of the power devices employed in each of the semiconductor power converter apparatus is decided as the overall occupation area is made different from the occupation ratio of the self-arc-suppressing semiconductor devices in other semiconductor power converter apparatuses, whereby the semiconductor power converter apparatus is constituted by the power devices which, while the switching characteristics and ON-voltage characteristics thereof are made different from one another, are accommodated in the same package. Thus, the forward conversion capacities and the reverse conversion capacities of a plurality of semiconductor power converter apparatuses connected to the D.C. capacitor can be made different from one another. Therefore, the more suitable semiconductor power converter apparatuses can be selected in accordance with the various loads, and by employing the same package for the power devices, the product cost of the power converter system as well as the product cost of the semiconductor power converter apparatus can be reduced.

In addition, since the semiconductor power converter apparatus in which the forward-converted electric power becomes larger than the reverse-converted electric power is constituted by using the power devices having the large occupation ratio of the self-arc-suppressing semiconductor devices, for example, the capacity of the motor as the drivable load of the power converter system can be increased.

In addition, since the semiconductor power converter apparatus is constituted by using the power devices which are constituted by a plurality of self-arc-suppressing semiconductor device chips and a plurality of diode chips and in which the occupation ratio of the self-arc-suppressing semiconductor device chips to the overall number of chips are made different from one another, the forward conversion capacities and the reverse conversion capacities of a plurality of semiconductor power converter apparatuses connected to the D.C. capacitor can be different from one another. Thus, the more suitable semiconductor power converter apparatuses can be selected in accordance with the various loads. Also, the constituent elements in which the chips have the same characteristics are applied thereto, whereby the product cost of the power converter system as well as the product cost of the semiconductor power converter apparatus can be reduced.

In addition, since the semiconductor power converter apparatus is constituted by using the power devices in each of which the self-arc-suppressing semiconductor device regions, the diode regions, the separation zone between the self-arc-suppressing semiconductor device regions and the diode regions, and the gate regions are formed on the same semiconductor wafer, and in which the occupation ratios of the self-arc-suppressing semiconductor device regions to the overall effective area are made different from one another, the forward conversion capacities and the reverse conversion capacities of a plurality of semiconductor power converter apparatuses connected to the D.C. capacitor can be made different from one another. Therefore, the more suitable semiconductor power converter apparatuses can be selected in accordance with the various loads.

Moreover, since the semiconductor power converter apparatus is constituted by using the power devices each of which is constituted by a plurality of Insulated Gate Bipolar Transistor chips or a plurality of Injection Enhanced Gate Transistor chips and a plurality of diode chips and in which the occupation ratios of the Insulated Gate Bipolar Transistor chips or the Injection Enhanced Gate Transistor chips to the overall number of chips are made different from one another, the forward conversion capacities and the reverse conversion capacities of a plurality of semiconductor power converter apparatuses connected to the D.C. capacitor can be made different from one another. Therefore, the more suitable semiconductor power converter apparatuses can be selected in accordance with the various loads. In addition, by applying thereto the constituent elements in which the chips themselves have the same characteristics, the product cost of the power converter system as well as the product cost of the semiconductor power converter apparatus can be reduced.

Moreover, since the semiconductor power converter apparatus is constituted by using the power devices in which the occupation ratios of the gate commutation type turn-off thyristor regions to the overall effective area of the gate commutation type turn-off thyristor regions and the diode regions which are formed on the same wafers, respectively, are made different from one another, the forward conversion capacities and the reverse conversion capacities of a plurality of semiconductor power converter apparatuses connected to the D.C. capacitor can be made different from one another. Therefore, the more suitable semiconductor power converter apparatuses can be selected in accordance with the various loads.

Also, since the semiconductor power converter apparatus is constituted by the power devices each of which is constituted by a plurality of Insulated Gate Bipolar Transistor chips or a plurality of Injection Enhanced Gate Transistor chips and a plurality of silicon carbide diode chips, the loss of the power converter system as well as the loss of the semiconductor power converter apparatus can be reduced.

Also, since all of the power devices constituting the semiconductor power converter apparatus are cooled by the same cooling piece(s)(heat sink), the semiconductor power converter apparatuses which are different in the forward conversion capacity and the reverse conversion capacity from one another can be manufactured using the same constituent components and parts. Therefore, the manufacture cost of the power converter system as well as the manufacture cost of the semiconductor power converter apparatus can be reduced.

While the present invention has been particularly shown and described with reference to the preferred embodiments, it will be understood that the various changes and modifications are possible for those skilled in the art without departing from the scope and spirit of the invention. The scope of the invention is therefore to be determined solely by the appended claims.

What is claimed is:

1. A power converter system comprising:

a first semiconductor power converter for connection to a power source;

a second semiconductor power converter for connection to a load; and a DC capacitor to which the first and second semiconductor power converters are connected in parallel, wherein each of the first and second semiconductor power converters includes a plurality of power devices having identical circuit configurations, each power device including at least one self-arc-suppressing semiconductor switch and at least one diode connected in anti-parallel with the corresponding self-arc-suppressing semiconductor switch, all of the power devices have the same cooling area, and the power devices of the first semiconductor power converter and of the second semiconductor power converter reach identical temperatures in response to different currents flowing in the same direction through the respective power devices of the first and second semiconductor power converters.

2. The power converter system according to claim 1, wherein the power devices of the first and second semiconductor power converters are cooled by heat sinks having identical outer shapes.

3. The power converter system according to claim 1, wherein the power devices of the first and second semiconductor power converters are cooled by cooling fins having identical outer shapes.

4. A power converter system comprising:

a first semiconductor power converter for connection to a power source;

a second semiconductor power converter for connection to a load; and a DC capacitor to which the first and second semiconductor power converters are connected in parallel, wherein each of the first and second semiconductor power converters includes a plurality of power devices having identical circuit configurations, each power device including at least one self-arc-suppressing semiconductor switch (SSS) and at least one diode connected in anti-parallel with the corresponding SSS, all of the power devices have the same electrode area, the power devices of the first semiconductor power converter and of the second semiconductor power converter reach identical temperatures in response to different currents flowing in the same direction through the respective power devices of the first and second semiconductor power converters, and each of the power devices includes a uniform number of semiconductor chips comprising diode chips including diodes and Insulated Gate Bipolar Transistor (IGBT) chips including IGBT's, and different numbers of IGBT chips are provided in the power devices of the first and second semiconductor power converters, respectively.

5. The power converter system according to claim 4, wherein the diode chips of each of said power devices comprise silicon carbide diode chips.

6. The power converter system according to claim 4, wherein the power devices of the first and second semiconductor power converters are cooled by heat sinks having identical outer shapes.

7. The power converter system according to claim 4, wherein the power devices of the first and second semiconductor power converters are cooled by cooling fins having identical outer shapes.

8. A power converter system comprising:

a first semiconductor power converter for connection to a power source;

a second semiconductor power converter for connection to a load; and a DC capacitor to which the first and second semiconductor power converters are connected in parallel, wherein each of the first and second semiconductor power converters includes a plurality of power devices having identical circuit configurations, each power device including at least one self-arc-suppressing semiconductor switch (SSS) and at least one diode connected in anti-parallel with the corresponding SSS, all of the power devices have the same electrode area, the power devices of the first semiconductor power converter and of the second semiconductor power converter reach identical temperatures in response to different currents flowing in the same direction through the respective power devices of the first and second semiconductor power converters, and each of the power devices includes a uniform number of semiconductor chips comprising diode chips including diodes and Injection Enhanced Gate Transistor (IEGT) chips including IEGT's, and different numbers of IEGT chips are provided in the power devices of the first and second semiconductor power converters, respectively.

9. The power converter system according to claim 8, wherein the power devices of the first and second semiconductor power converters are cooled by heat sinks having identical outer shapes.

10. The power converter system according to claim 8, wherein the diode chips of each of said power devices comprise silicon carbide diode chips.

11. The power converter system according to claim 8, wherein the power devices of the first and second semiconductor power converters are cooled by cooling fins having identical outer shapes.

12. A power converter system comprising:

a first semiconductor power converter for connection to a power source;

a second semiconductor power converter for connection to a load; and a DC capacitor to which the first and second semiconductor power converters are connected in parallel, wherein each of the first and second semiconductor power converters includes a plurality of power devices having identical circuit configurations, each power device including at least one self-arc-suppressing semiconductor switch (SSS) and at least one diode connected in anti-parallel with the corresponding SSS, all of the power devices have the same electrode area, the power devices of the first semiconductor power converter and of the second semiconductor power converter reach identical temperatures in response to different currents flowing in the same direction through the respective power devices of the first and second semiconductor power converters, and each of the power devices is a respective semiconductor wafer occupied by an SSS and the corresponding diode connected in anti-parallel with the SSS, and relative areas of the semiconductor wafers of the power devices of the first semiconductor power converter occupied by the SSS and corresponding diode are different from relative areas of the semiconductor wafers of the power devices of the second power converter occupied by the SSS and corresponding diode.

13. The power converter system according to claim 12, wherein the power devices of the first and second semiconductor power converters are cooled by cooling fins having identical outer shapes.

14. The power converter system according to claim 12, wherein the semiconductor wafers of the power devices of the first and second power converters have identical areas, the SSS's occupy a smaller proportion of the semiconductor wafers of the power devices of the first semiconductor power converter than occupied by the SSS's of the semiconductor wafers of the power devices of the second power converter.

15. The power converter system according to claim 14, wherein the first semiconductor power converter is connected to an AC power source, and the second semiconductor power converter is connected to a motor.

16. The power converter system according to claim 15, wherein the areas of each of the semiconductor wafers of the power devices of the first and second power converters are filled by the respective SSS, corresponding diode, a separation zone separating the SSS from the diode, and a gate region.

17. The power converter system according to claim 12, wherein each of the SSS's is a gate commutated thyristor.

18. The power converter system according to claim 12, wherein the power devices of the first and second semiconductor power converters are cooled by heat sinks having identical outer shapes.

* * * * *